July 31, 1962  C. C. FIGGE  3,046,977
HEATING KETTLE
Filed May 21, 1957  2 Sheets-Sheet 1
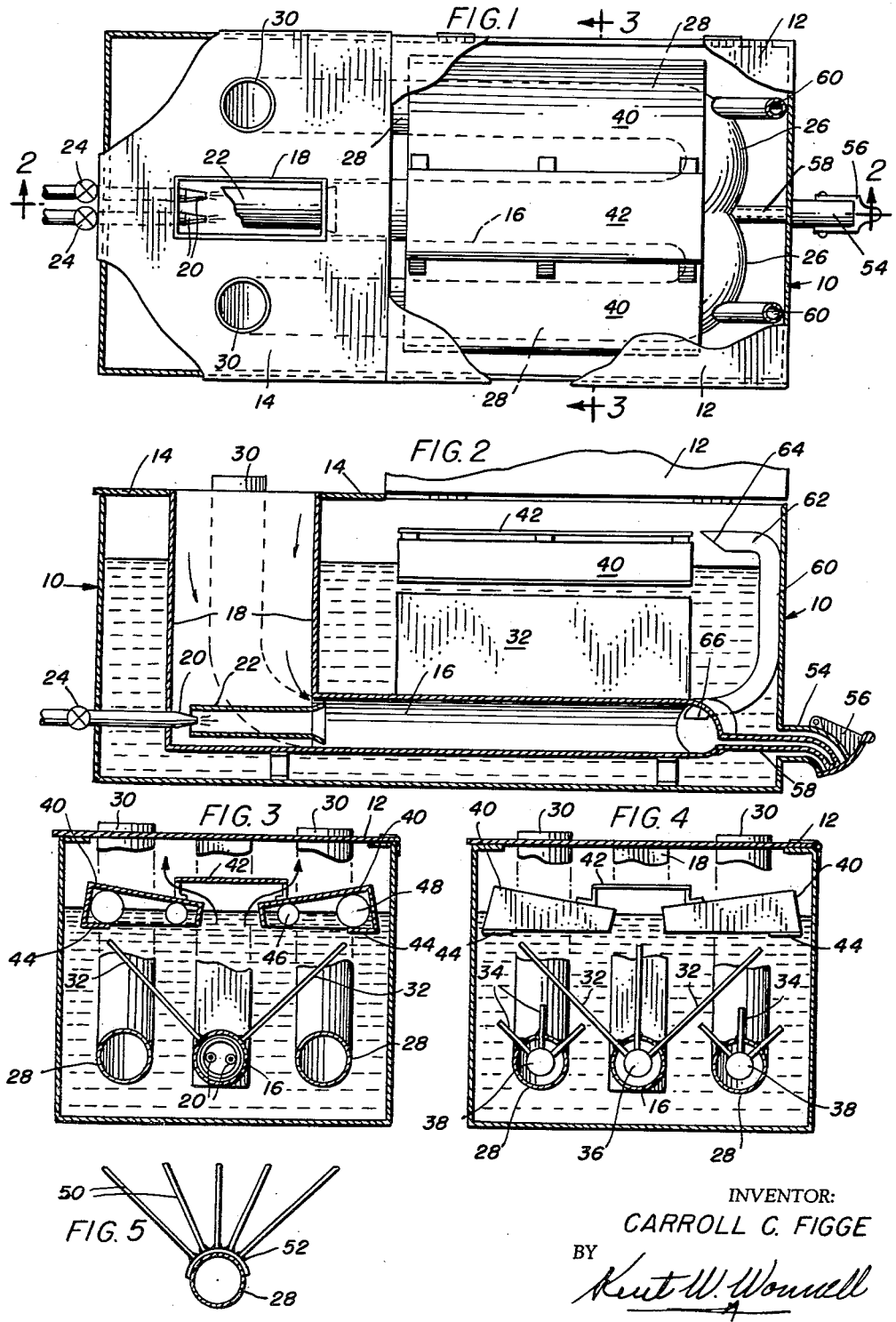
INVENTOR:
CARROLL C. FIGGE
BY
Kent W. Wonnell
ATT'Y July 31, 1962 C. C. FIGGE 3,046,977
HEATING KETTLE
Filed May 21, 1957 2 Sheets-Sheet 2
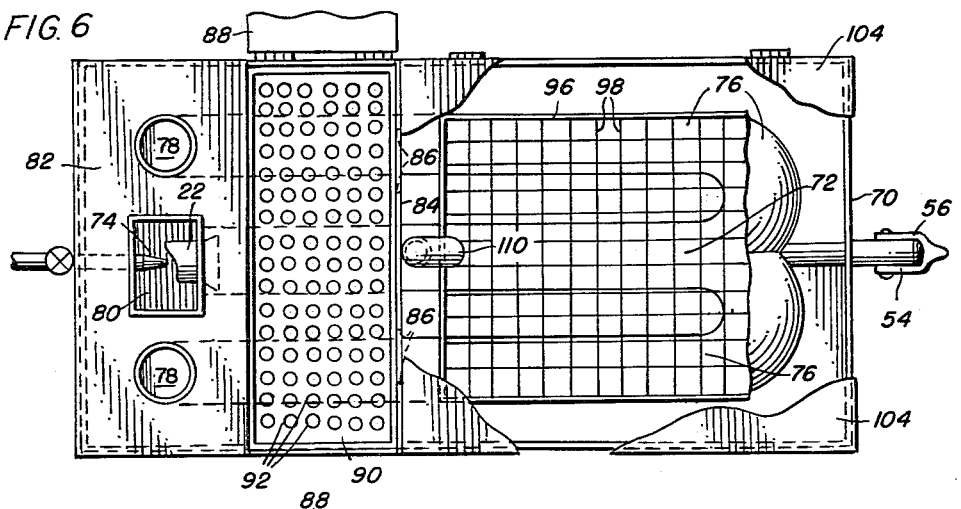
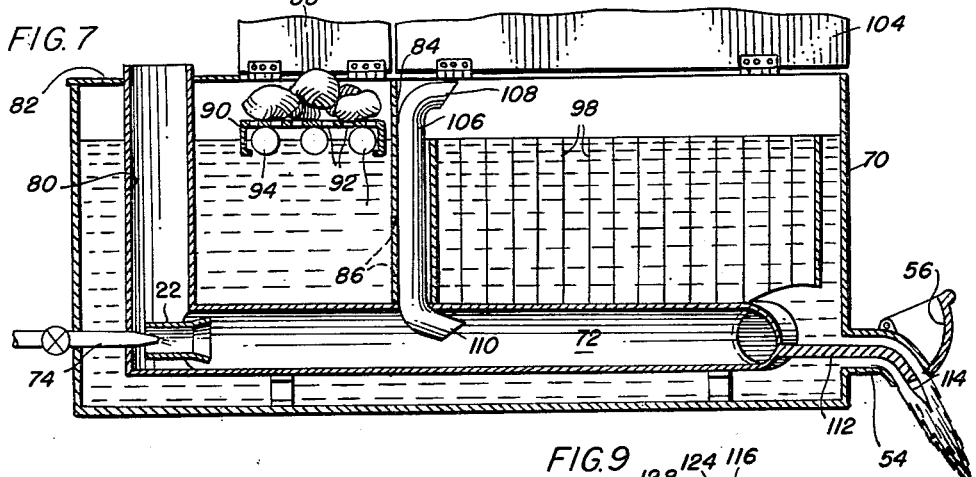
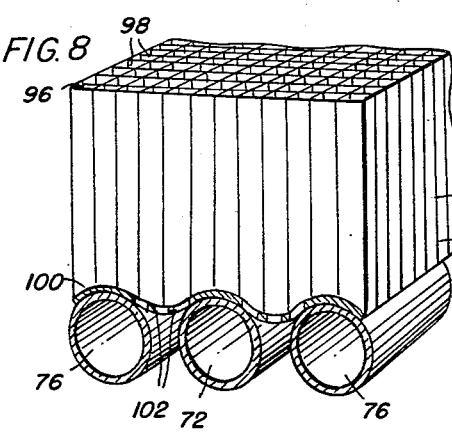
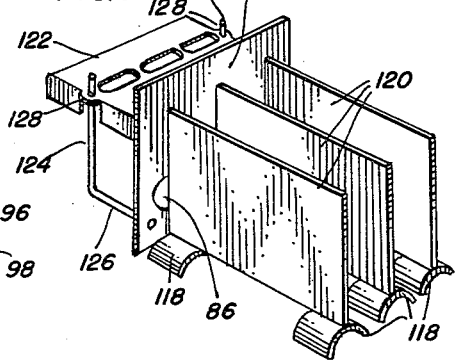
INVENTOR:
CARROLL C. FIGGE
BY
ATT'Y

3,046,977
HEATING KETTLE
Carroll C. Figge, Batavia, Ill.
(189 W. Madison St., Chicago 2, Ill.)
Filed May 21, 1957, Ser. No. 660,639
1 Claim. (Cl. 126—343.5)

This invention relates in general to a heating kettle and is more particularly described as a receptacle of this kind for melting and heating bituminous material as used in roofing. In preliminary heating and liquifying bituminous materials in a kettle or tank the hard material is placed against the heating pipes and subjected to the flow of heat. The result is that the area of the heat flow and application is greatly limited and the heat is excessive at the area of the pipes which the flame contacts. The result is that material oils are distilled and driven out of the material in contact with the pipes before the entire mass in the tank is sufficiently heated to become uniformly liquified. The essential oils driven out by this method causes the bituminous material which is drawn from the tank to become brittle so that a roof with such material applied either to the top or to the layers constituting a roof is in effect aged for years on the day it is applied. This results in a much reduced effective life for the roof treated with such materials.

Likewise in applying additional bituminous material to replenish a heated tank containing bituminous material, the cold lump which is added, usually by depositing it in the top of the tank drops to the bottom and chills the mass usually near the point of draw off so that until this solid mass becomes liquified the drawn off material is not in proper heated condition for application to a roof.

In depositing a large lump of bituminous material into an open tank, it is usually dumped or slid into the top of the tank in such a manner that it splashes the already heated material from the tank with the attendant danger of burning the operator or others passing near the tank, damaging the surrounding property with the splashed material and causing an undue amount of spillage of material which thereby not only constitutes a loss, but causes a great amount of dirt which is difficult to clean and remove.

The present invention overcomes these objections and in general includes the following among its objects of invention:

To increase the area of heat distribution and to provide for the action of convection currents within the tank; to provide a floating feed tray upon which lumps of bituminous material may be deposited for heating at the top of the liquified material, allowing the material from an added lump to gradually pass through the tray and to join the mass in the tank already liquified; to increase the area of heat distribution; to provide for an increased distribution and action of convection heating currents within the kettle; to additionally heat the material in the draw-off cock so it will not be at a reduced temperature; to draw fumes from the surface of the material in the tank and to discharge gases into the heating pipes where they will be reburned; to increase the area of heat transmission into the mass rather than to wait for the mass to transmit heat from limited contact with the tubes; to reduce the surface temperature of material in the tank which reduces the fire hazard; to protect the operator to the feeds material into the tank; to blanket the surface of the molten mass with a tray which prevents excessive splashing when the kettle or tank is being moved; to support cold lumps of material upon the mass until they are melted, heaping the cold material from the draw-off cock area to restrain the distilling action caused by the heating pipes by blanketing the surface with a tray reducing objectionable odors of the gases; and in general to produce the construction herein shown and described.

Other objects of the invention will appear in the specification and will be apparent from the accompanying drawing in which, FIG. 1 is a top plan view of a heating kettle with some parts in section constructed in accordance with the principles of this invention; FIG. 2 is a longitudinal section taken on the line 2—2 of FIG. 1; FIG. 3 is a transverse section taken on the lines 3—3 of FIG. 1; FIG. 4 is a sectional view illustrating a modification of the convection heating means as shown in FIG. 3; FIG. 5 is a sectional view of a heat distributor applied to the outside of a heating pipe; FIG. 6 is a top plan view of a modified form of heating kettle; FIG. 7 is a longitudinal section of the kettle of FIG. 6; FIG. 8 is a perspective view of a heat dispersing and distributing unit; and FIG. 9 is a perspective view of a removable attachment for a heating cabinet in accordance with this invention.

When a tank or kettle for heating bituminous material becomes cold, the material solidifies around the heating pipes and in the tank so that there is a problem of liquifying the mass without unduly vaporizing the volatile oils and in distributing the heat so that the material becomes liquified more quickly. There is also the problem of replenishing the materials which usually are deposited in large lumps or chunks of the material in a relatively cold and solid condition.

The present invention provides new and improved means for accomplishing these results as well as more effectively conserving the materials without unduly heating them and still making effective use of the heat.

Referring now more particularly to the drawings, this heating kettle is shown in the form of a rectangular tank 10 usually made of sheet metal with a hinged top 12 extending over a portion of the top and a removable cover 14 extending over the remainder of the top. Although not so shown, this tank is usually mounted on wheels or carried in a wheeled truck for transporting it bodily from one place to another where the heated material is to be used.

Within the tank and spaced above the bottom is a central heating pipe 16 terminating in an open well 18 near one end with the open well extending upwardly through the cover to provide a supply of air for one or more fuel discharge nozzles 20 which extend through the adjacent end of the tank and through the wall of the well 18 into a burner shell 22 which fits loosely into the heating pipe 16 to provide an air inlet. The discharge nozzles are controlled by valves 24 at the outside of the pipe which are manually operated to vary the amount of heat applied to the tank.

At the other end of the central heating pipe are opposite reversely rounded ends 26 which are connected to heating pipes 28 which extend parallel to the central heating pipe and each terminates at the other end in an upwardly rounded extension 30 which projects through the removable cover 14 for heating other portions of the tank and discharging exhaust gases from the burner. To increase the area of heat distribution and to provide for convection currents from the heating pipes, heating ribs or fins 32 may be connected to the central pipe 16 extending angularly upward therefrom and heating ribs 34 may extend upwardly from the outer surfaces of the heating pipes 28. These fins and ribs may also extend through their respective pipes to hollow or solid heat retaining masses 36 and 38 centrally located in the heating pipes 16 and 28 for receiving and storing the heat from the fuel and for conveying it angularly upward by means of the fins or ribs to various parts of the tank. By this means, the heat in the pipes will be more quickly distributed through the tank. The flow of heat will be somewhat retarded by the masses 36 and 38 mounted in the pipes, and the result is a more effective distribution of the heat at all times and a more rapid heating of the material in the tank at the start or when it is in a cold condition.

Another heat distributing means is shown in FIG. 5 in which fins 50 are secured to and extend radially from a circular holder 52 adapted to fit closely over the pipes as 28 to directly receive the heat therefrom and to transmit it by means of the fins and angularly outward from the pipe.

A load receiving tray comprises two inverted receptacles 40 open at the bottom, closed at the ends, of a width to fit loosely in the tank and of a length to fit loosely in the space under the hinged top 12. Each receptacle 40 is shorter at the inner edge than at the outer edge and is inclined inwardly, the receptacles being secured together in spaced apart relation and in inclined position by a connecting bridge 42 which allows a free passage of fumes from between the receptacles and below the connected sides of the bridge and also allows melted liquid such as bituminous material to flow downwardly on the inclined surfaces of the receptacles under the bridge and centrally of the load receiving tray.

At the outer edge of each receptacle 40 is an inwardly extending lip 44 at the under side which helps to partially close the receptacle, to increase the buoyancy and stability of the tray when it is supported at the top of molten liquid in the tank. To additionally support the tray, each of the receptacles is provided with longitudinally extending buoyant cylinders 46 and 48 which may differ in diameter due to the inclined position of the receptacles.

This load receiving tray is relatively light and buoyant and it will support a large mass or lump of material deposited thereon preventing the material from sinking immediately in the tank when it is replenished. As the lump or mass of material resting upon the tray is heated and melted in the tank by the hot material below it, the liquid portion of the mass runs down the inclined surfaces of the receptacles 40 to the center thereof and also passes around the sides and ends of the tray so that the material is added slowly and gradually without unduly cooling the heated mass of material in the tank. Thus the heated material may be continuously used without waiting for replenishing mass to be assimilated into the heated material.

A draw off cock 54 has a pipe with a hinged closure 56 at the end and in order to prevent material from freezing or solidifying in the pipe and to more quickly liquify any material which has solidified in the pipe, a hollow pipe 58 closed at the outer end extends from the central heating pipe 16 into the cock 54 and close to the closure so that heat will be conveyed directly therein as soon as heat is available in the main heating pipe 16, thereby melting any accumulation, bituminous matter in the cock and in keeping the cock in heated condition at all times that the kettle is operated. In operating a kettle of this kind for bituminous material, the more volatile gases and materials constantly appear at the top of the liquid and these gases may become objectionable in volume and in odor as well as causing a loss of important heating ingredients. To overcome this objection, a syphon (or syphons) is mounted at the draw-off end of the tank comprising a pipe 60 with a bend 62 at the top having an angular cut-off 64 forming an inlet over the normal level of liquid at the tank. Each syphon has the lower end of its pipe extending into one of the return heating pipes 28 with an angular cut-off 66 at the end within the heating pipe in a position to induce a flow of air or gas downwardly in the pipe 60 due to the rapid flow of the heating gases in the pipe 28.

With this construction, a mass of cold or solidified material in the tank is quickly heated by means of the direct and return heating pipes 16 and 28, the heat from the pipes is quickly transmitted to other parts of the tank by heating ribs and fins and the draw-off cock is also heated to liquify any material in it. The hinged top 12 may be raised to uncover a portion of the tank and the cover 14 although positioned by the open well 18 and the upper ends of the pipes 30 may also be raised from them to uncover the remainder of the tank. If the load receiving tray is not already engaged in the material at the top of the tank, the tray may be placed on the material before it is mounted and as it becomes melted, the tray will sink to the level permitted by the floatation receptacles 40 and the buoyant cylinders 46 and 48 thereof, ready to receive any material which may be placed thereon for replenishing the material of the tank.

As material is withdrawn from the cock 54, there will be no stoppage or necessity to heat the draw off cock with a blow torch in order to discharge material therefrom as it remains in a liquid state. Objectionable fumes and gases are withdrawn from the top of the tank by syphoning action whether the top 12 is closed or not, the gases being more effectively removed and burned when the cover is closed, but it being necessary to keep the cover open or partially closed when lumps or masses are deposited on top of the load receiving tray in replenishing the tank.

In a modified form of the kettle as shown in FIGS. 6, 7 and 8 a receptacle in the form of a tank 70 has a central inlet heating pipe 72 receiving heating fuel from a discharge nozzle 74 at one end and the other end of the heating tube being divided and turned reversely near the bottom of the tank to form parallel side heating pipes 76 which terminate in upward discharge pipes 78 near the inlet end of the heating tube. At this end is a well 80 extending at the top of the tank to the end of the central heating pipe 72 to provide an air inlet for the pipe and the burner nozzle 74.

At the top of the tank is a lid 82 which extends over the upper ends of the pipes 78 and the air well 80 so that they are open to the atmosphere and although the lid usually is retained in fixed position, it may be removed by slipping it off of the upper projecting ends of the pipes and the well.

Intermediate the ends of the tank but preferably closer to the lid 82 is a vertical partition 84 which extends at least to the tops of the pipes 72 and 76 and near the bottom is provided with openings 86 for additional communication between chambers at the opposite sides of the partition. That portion of the tank at one side of the partition and near the lid 82 is provided with a movable or hinged cover 88 to extend over this portion of the tank which provides a filling opening for replenishing the material of the tank in relatively small quantities by means of lumps and broken pieces which may be deposited in the filling opening. In order to prevent such lumps from passing immediately to the bottom of the tank and thereby unduely cooling the material therein, a float 90 is provided which receives the lumps and is designed to sink partially with the lumps but to allow the molten part of such filling material to pass through holes 92 or other openings in the float. The tray is supported by flotation cylinders 94 or other buoyant supports, the replenishing material is deposited on the float and although it may be sunk under the load, the melting of the material will cause the float or reception tray to rise to the top of the liquid.

In order to quickly transfer heat from the heating pipes 72 and 76, a heat distributor as shown more clearly in FIG. 8 comprises a plurality of thin metal fins 96 and 98 preferably at right angles to each other, are mounted upon a supporting base 100 which has holes 102 therethrough to permit free passage of liquified material in a vertical direction through and with respect to the pipes. The base 100 is preferably corrugated or formed with waves to fit over the tops of the heating pipes 72 and 76 so that the waved portions rest closely upon the tops of the tubes to receive the maximum amount of heat transferred from the pipes and by the fins transferred throughout the mass of the material in the tank.

This construction is particularly valuable in quickly transferring heat from the pipes throughout the mass when it is cold or solid, but also contributes materially to the efficient distribution of the heat throughout the tank at all times. The upper ends of the fins 96 and 98 preferably terminate just below the normal level of molten liquid retained in the tank but are sufficiently strong to uphold a large chunk of material which may be deposited at the top in this portion of the tank which may be normally closed by a hinged cover 104. If desired, a load receiving tray 40 may also be placed in this portion of the tank with the same function and operation as heretofore described, the upper ends of the fins 96 and 98 limiting the depression of the tray under the load of cold material placed upon it.

The construction of the supporting base 100 is such that it conforms to the surface of a heating pipe or pipes to which it is applied and may be attached to such pipes but is preferably seated thereon so that it and the fins may be removable for cleaning and other purposes.

An ejector or syphon 106 may also be placed in the tank 70 preferably located at one side of the partition 84 with an angularly cut inlet 108 at the top and a suction outlet 110 at the bottom located at the top of the heating pipe 32. With this location, the fumes and gases are drawn from the top of the liquid in the main portion of the tank and are discharged into the central heating pipe near the fuel inlet thereof where these gases will also be burned, thereby adding fuel to the heating pipe, utilizing the gases which would otherwise be wasted, minimizing the escape of odors from the tank, reducing the first hazard and preventing the burning of the workers and operators.

At the end of the tank opposite the inlet is a draw-off cock 54 as previously shown with its hinged closure 56, but instead of a hollow pipe extending into the draw off cock as shown in FIG. 2, a solid heat conducting rod 112 is extended from the heating pipe 72 inside and through the heating cock to the outer discharge end thereof close to the closure 56 thereof so that when the closure is opened for discharging material from the cock, the outer end of the heating rod 112 forms a void space 114 in the liquid discharge, thereby tending to draw the outer portions of liquid inwardly, keeping it in a more solid stream, preventing the liquid from spreading or spraying out and thereby adding a fire safety feature to the liquid discharge.

With this construction, in the ordinary feeding of smaller lumps and quantities of material for replenishing the tank, the cover 104 may remain closed and the cover 88 may be raised. The material fed in this location is nearest to the discharge pipes 78 and the well 80 where heat will be applied to any material deposited upon the float 90. The float may sink partially into material already liquidated but the cold lumps will be retained at a distance from the discharge or draw off cock, thereby allowing this fed material gradually to become liquid to pass through the float 90 and into the space above and around the heating pipes 72 and 76 and through openings 86 in the partition 84 to mingle with the already liquified material in the larger section of the tank. This will cause a natural flow of replenishing cold material from the feeding chamber where it is first gradually heated by the discharge pipes 78 and then fully liquified by the heating pipe 72 at its initial or hottest position, the flow of the liquid then continuing through the larger chamber of the tank and toward and out of the draw off cock when material is discharged therefrom.

Instead of building all of this equipment into a tank or receptacle, a removable and replaceable attachment may be provided for heating kettles already in existence having heating and return pipes and a draw off cock. An attachment of this kind is shown in FIG. 9 comprising a partition 116 which fits transversely of a tank or receptacle to which it is applied and the partition is supported at its lower edge by a base 100 as shown in FIG. 8 or by separate curved supports 118 spaced apart to rest upon supporting heating pipes as 72 and 76 which may be a part of a heating kettle to which the attachment is applied. Extending at one side of the partition 116 are heat dispersing vanes or plates 120 which transfer heat from the supports 118 and from the plate to the larger chamber of a receptacle 70. The outer lower edges of these plates 120 may also be supported on heating pipes as 72 and 76 by similar curved supports 118 as applied at the bottom of the partition.

At the other side of the partition is a float 122 for receiving lumps, chunks or pieces of bituminous material deposited thereon, as upon the float 90 in FIG. 7, and this float 122 is maintained in proper spaced relation free from the partition 116 and also free to move in a vertical direction in a receptacle by guiding rods 124 each having a bent lower end 126 for attaching it near the bottom of the partition 116. A fastening clip 128 is attached at each end of the float and forms a loop through which the vertical portion of the rod 124 extends freely and loosely so that the float is free to rise and sink into the bituminous material depending upon the replenishing load which is deposited or carried by the tray.

This attachment may be freely inserted in an existing tank or receptacle having heating pipes and provides a heat directing means which may be installed in any existing heating kettle of this kind. The partition separates the receptacle into a chamber for receiving replenishing material with a float for supporting the material therein where the greatest heat is applied and the heat transferring plates extend into the larger chamber of the receptacle for dispersing heat more readily therein as in the other forms. Heat currents in the material are also directed from the float chamber at one side of the partition down and around the lower portion of the partition and thence toward the draw off end of the receptacle. Attachment of this kind may thus be supplied for heating kettles already in operation, the construction of the attachment thereby providing some of the novel features and functions of the invention.

While preferred costructions have been described in some detail, they should be regarded as illustrations or examples rather than as limitations or restrictions of the invention, since various changes in the construction, combination, and arrangement of the parts may be made without departing from the spirit and scope of the invention.

I claim:

A heating kettle for heating masses of bituminous material, comprising a receptacle open at the top having a hinged lid over a portion and a removable cover over the remainder of the top, a heating pipe near the bottom with an open well at one end extending upwardly from the heating pipe through the cover, fuel feeding means extending through this end of the receptacle and through the adjacent wall of the well to discharge into the pipe, oppositely bent return portions of the pipe at the other end extending parallel thereto and having an upward discharge portion extending through the cover at the sides of the well; in combination with floatation means for receiving chunks of bituminous material and feeding them into the receptacle as the mass within the receptacle becomes heated and leaving a space between the top of material in the receptacle and the cover, and an ejector pipe having an inlet above the normal surface of liquid in said space at the top of the receptacle for removing fumes, and an ejecting end projecting into the heating pipe containing exhaust gases whereby said fumes are siphoned through the ejector pipe with the exhaust gases of the heating pipe.

(References on following page)

References Cited in the file of this patent

UNITED STATES PATENTS

| | | |
|---|---|---|
| 1,742,968 | Polak | Jan. 7, 1930 |
| 2,188,133 | Hepburn | Jan. 23, 1940 |
| 2,322,341 | Booth | June 22, 1943 |
| 2,396,748 | Pitman | Mar. 19, 1946 |
| 2,465,953 | Wollner | Mar. 29, 1949 |
| 2,494,260 | Osmond | Jan. 10, 1950 |
| 2,496,113 | Wollner | Jan. 31, 1950 |
| 2,544,153 | Hall | Mar. 6, 1951 |
| 2,813,578 | Ferguson | Nov. 19, 1957 |
| 2,839,332 | Sackett | June 17, 1958 |

FOREIGN PATENTS

| | | |
|---|---|---|
| 857,555 | France | Sept. 19, 1940 |
| 1,040,204 | France | Oct. 13, 1953 |